(12) United States Patent
Taminiau

(10) Patent No.: US 10,512,974 B1
(45) Date of Patent: Dec. 24, 2019

(54) DIAMOND MACHINING TOOL

(71) Applicant: Quantum Valley Investment Fund LP, Waterloo (CA)

(72) Inventor: Ivar Allard Joachim Taminiau, Waterloo (CA)

(73) Assignee: Quantum Valley Investment Fund LP, Waterloo (CA)

( * ) Notice: Subject to any disclaimer, the term of this patent is extended or adjusted under 35 U.S.C. 154(b) by 0 days.

(21) Appl. No.: 15/828,754

(22) Filed: Dec. 1, 2017

Related U.S. Application Data

(60) Provisional application No. 62/431,348, filed on Dec. 7, 2016.

(51) Int. Cl.
*B23C 5/10* (2006.01)
*B23B 27/20* (2006.01)
*B29C 59/02* (2006.01)

(52) U.S. Cl.
CPC .............. *B23C 5/109* (2013.01); *B23B 27/20* (2013.01); *B29C 59/022* (2013.01); *B23B 2226/31* (2013.01); *B23C 2200/243* (2013.01)

(58) Field of Classification Search
CPC ......... B23B 27/20; B23B 29/08; B23B 27/08; B23B 27/083; B23B 27/086; B23C 5/109; B23C 2210/60
See application file for complete search history.

(56) References Cited

U.S. PATENT DOCUMENTS

| | | | |
|---|---|---|---|
| 1,453,133 A * | 4/1923 | Heinze | B23B 27/007 407/117 |
| 4,563,114 A | 1/1986 | Casstevens | |
| 7,198,043 B1 | 4/2007 | Zhang | |
| 7,445,409 B2 | 11/2008 | Trice et al. | |
| 7,556,456 B2 | 7/2009 | Yochinaga et al. | |
| 9,545,024 B2 | 1/2017 | Tan et al. | |
| 2007/0039433 A1 | 2/2007 | Bryan et al. | |
| 2015/0196981 A1 | 7/2015 | Tan et al. | |

FOREIGN PATENT DOCUMENTS

| | | | | |
|---|---|---|---|---|
| EP | 0079243 A1 * | 5/1983 | | B23B 27/20 |
| GB | 1313568 A * | 4/1973 | | B23B 27/16 |
| WO | WO-2006003788 A1 * | 1/2006 | | B23B 27/20 |

* cited by examiner

*Primary Examiner* — Alan Snyder
(74) *Attorney, Agent, or Firm* — Henry Patent Law Firm PLLC

(57) ABSTRACT

In a general aspect, a machining tool includes a diamond crystal having a working section configured to machine a workpiece. The machining tool includes a body and a shank extending from the body. The shank defines a cylindrical slot outside the body. The machining tool includes an assembly carried by the shank. The assembly includes a cylindrical pin that resides in the cylindrical slot. The assembly also includes a diamond crystal secured to an end of the cylindrical pin. The diamond crystal has a curved perimeter that defines a working section, which contacts a workpiece during operation of the machining tool. The shank is adapted to allow rotation of the cylindrical pin within the cylindrical slot to modify the working section.

19 Claims, 8 Drawing Sheets

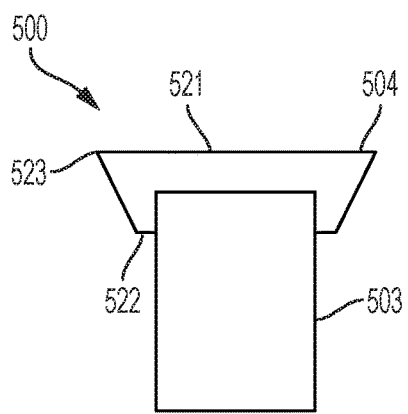
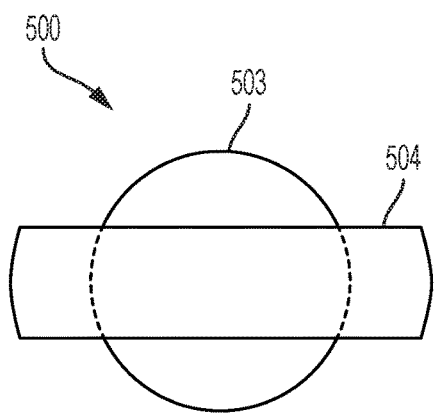
FIG. 5A
FIG. 5B

DIAMOND MACHINING TOOL

CROSS-REFERENCE TO RELATED APPLICATIONS

This application claims priority to U.S. Provisional Application No. 62/431,348, filed Dec. 7, 2016 and entitled "Diamond Machining Tool," which is hereby incorporated by reference.

BACKGROUND

The following description relates to a machining tool.

Machining tools have been used to machine metal, plastic, crystal and other classes of materials with a high degree of precision. Machining tools can be used, for example, to shape or finish a workpiece by cutting, boring, grinding, shearing or otherwise. Some machining tools include a diamond cutting edge that contacts the workpiece to remove material. The diamond cutting edge can become dull over time and require replacement or sharpening.

DESCRIPTION OF DRAWINGS

FIG. 5A shows a side view of another example assembly 500 that can be included in a diamond machining tool. FIG. 5B shows a top view of the example assembly 500 shown in FIG. 5A.

DESCRIPTION

The following description relates to single point diamond machining tools.

Figure 1:
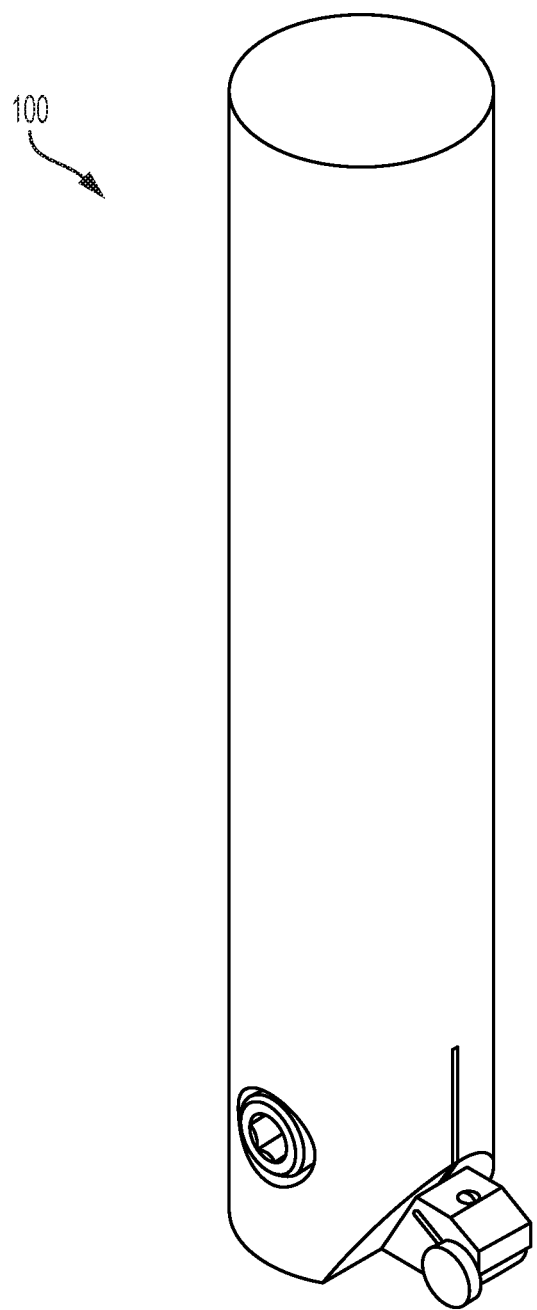
FIG. 1 is a perspective view of an example machining tool.

FIG. 1 is a perspective view of an example tool 100. The tool 100 shown in FIG. 1 is an example of a diamond machining tool that can be used to machine a workpiece. In some cases, the workpiece can be a crystal material, such as, for example, a silicon crystal or another type of crystal workpiece. The example tool 100 can be used to machine a flat surface of the workpiece, for instance, a component having a thin planar geometry. The tool 100 can also be used to machine curved or shaped surfaces, for instance, using computer numerical control.

In some implementations, the tool 100 can be used to machine one or more components of an interferometer system, a diffraction grating system, an x-ray diffractometer system or another type of system. For example, the tool 100 may be used to machine the blades 802 of the example neutron interferometer 800 shown in FIG. 8. The tool 100 may be used to manufacture other types of systems.

The example tool 100 includes a diamond crystal having a sharp working section that contacts the workpiece during the machining process. In some cases, the working section of the diamond crystal can bear on a silicon crystal workpiece to rule (i.e., to plane or shave) the outer surface of the silicon crystal. In some cases, the diamond crystal contacting the workpiece causes a local phase transition in the workpiece that aides the machining process. For example, a silicon crystal can locally, under influence of the tool 100, transition to a ductile mode that allows the tool 100 to form a smooth (ductile mode) cut on the surface of the silicon crystal.

In some aspects of operation, the working section of the diamond crystal is translated along the surface of the workpiece to machine the surface. The tool 100 can iteratively machine linear sections of the surface. For instance, the tool 100 can machine linear sections by translating in a first direction; after completing an individual linear section, the tool 100 progresses to the next linear section by moving in a second direction.

Figure 2A:
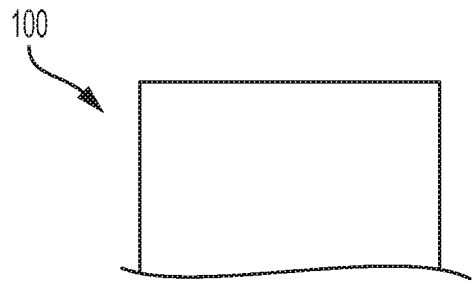
FIG. 2A shows a side view of the example tool 100 shown in FIG. 1.
Figure 2A:
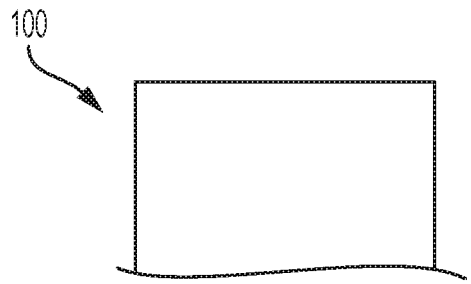
Figure 2A:
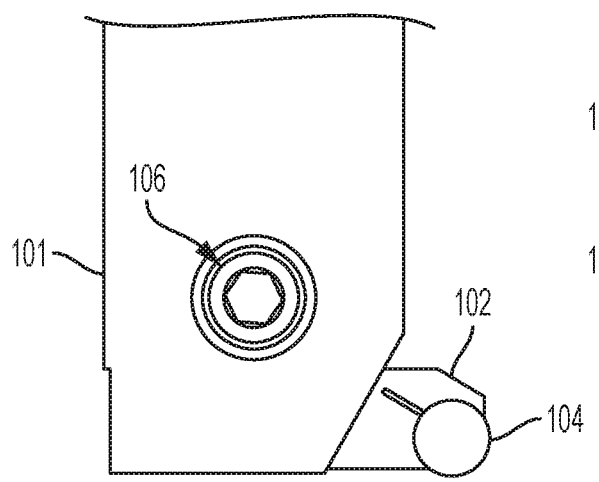
Figure 2B:
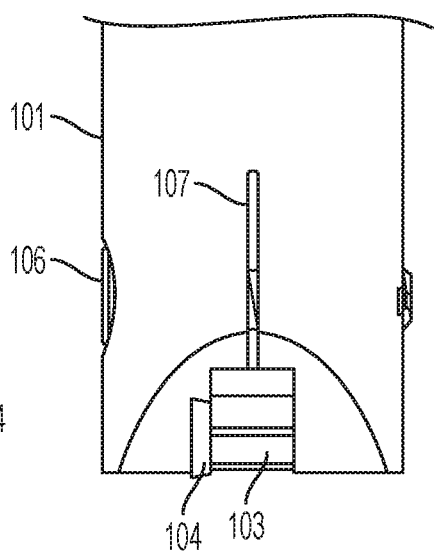
FIG. 2B shows a front view of the example tool 100 shown in FIG. 1.
Figure 2C:
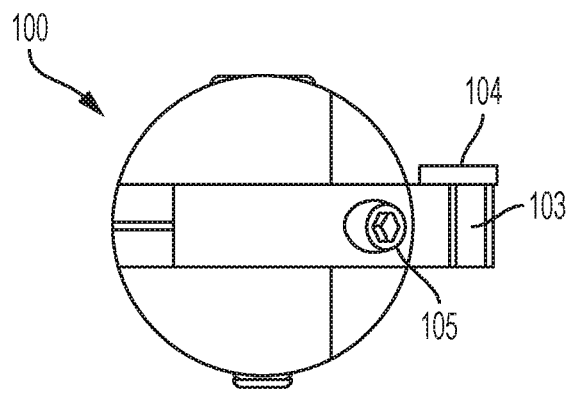
FIG. 2C shows a bottom view of the example tool 100 shown in FIG. 1.

FIG. 2A shows a side view of the example tool 100 shown in FIG. 1; FIG. 2B shows a front view of the example tool 100 shown in FIG. 1; FIG. 2C shows a bottom view of the example tool 100 shown in FIG. 1. As shown in FIGS. 2A, 2B and 2C, the example tool 100 includes a body 101, a shank 102, a pin 103, a diamond crystal 104, a screw 105 and a screw 106. The example tool 100 may include additional or different components, and the components may be configured as shown or in another manner.

The body 101 is generally cylindrical and includes a slot 107 and an opening below the slot 107 that holds the shank 102. The body 101 also includes a cylindrical bore that receives the screw 106. The screw 106 may be threaded or otherwise fastened in the bore to secure the shank 102 in the opening below the slot 107.

Figure 3A:
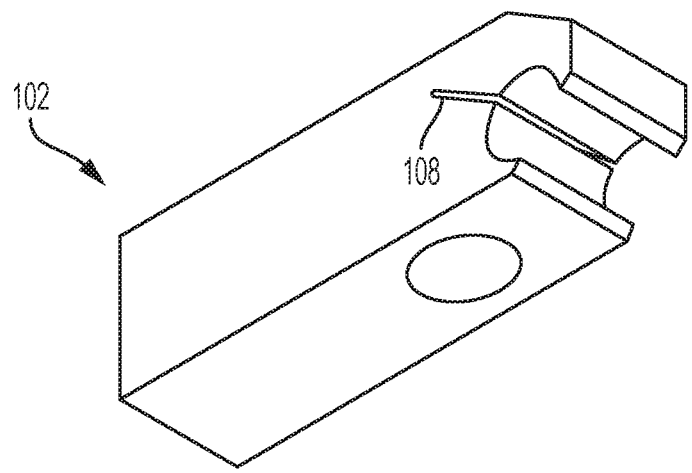
FIG. 3A shows a perspective view of the example shank 102 shown in FIG. 2A.
Figure 3B:
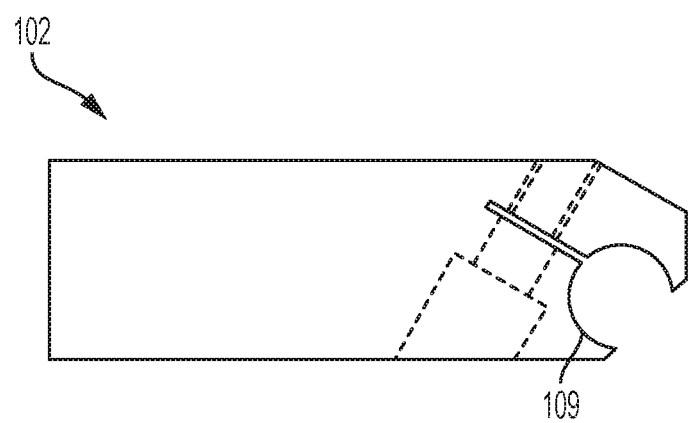
FIG. 3B shows a side view of the example shank 102.

FIG. 3A shows a perspective view of the example shank 102 shown in FIG. 2A; FIG. 3B shows a side view of the example shank 102. As shown in FIGS. 3A and 3B, the shank 102 includes a cylindrical slot 109 that holds the pin 103. The shank 102 includes a cylindrical bore through a slot 108, and the slot 108 opens to the cylindrical slot 109. The screw 105 (shown in FIG. 2C) can be threaded or otherwise fastened in the bore of the shank 102 to secure the pin 103 in the cylindrical slot 109.

Figures 4A, 4B:
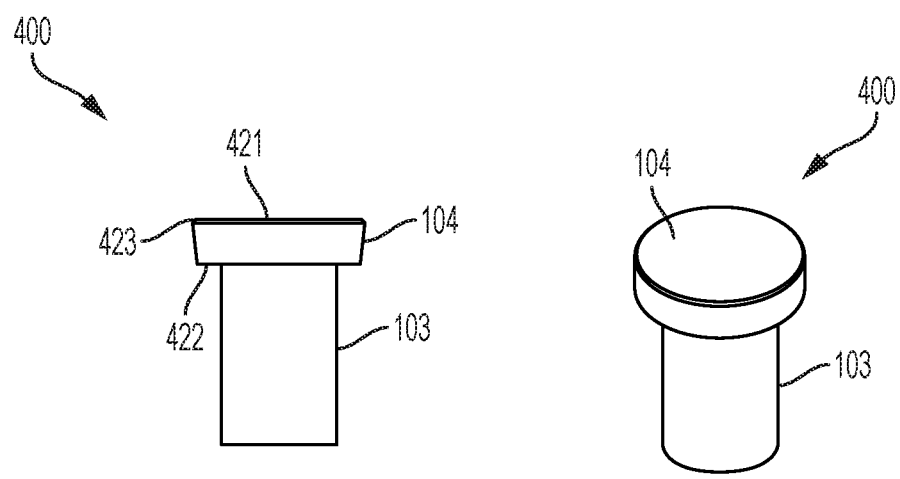
FIG. 4A shows a side view of an example assembly 400 that can be included in a diamond machining tool.
FIG. 4B shows a perspective view of the example assembly 400 shown in FIG. 4A.

FIG. 4A shows a side view of an example assembly 400 that can be included in a diamond machining tool such as, for example, the tool 100 shown in FIG. 1. FIG. 4B shows a perspective view of the example assembly 400 shown in FIG. 4A. The assembly 400 includes the pin 103 and diamond crystal 104 shown in FIGS. 2A, 2B, 2C. The pin 103 has a cylindrical shape, and the diamond crystal 104 is secured to an end of the pin 103. The diamond crystal 104 has a generally frustoconical shape. As shown in FIG. 4A, the diameter of the diamond crystal 104 increases from a first end 422 (nearest the pin 103) toward a second end 421 (farthest from the pin 103). The circular perimeter 423 of the diamond crystal 104 at the second end 421 in some cases has a chamfered edge.

In some examples, the pin 103 has a diameter of 4 millimeters (mm) and a length of 8 millimeters (mm); the diamond crystal 104 has a diameter of 6 millimeters (mm); the diamond crystal 104 has an axial length (from the first end 422 to the second end 421) of 1 millimeter (mm); the second end 421 of the diamond crystal 104 is chamfered at 45 degrees from the second end 421, forming a chamfer face having an axial length of 35 micrometers (μm). The assembly 400 and its components may have other dimensions. In some examples, the pin 103 is made of tungsten, and the diamond crystal 104 is made of synthetic single crystal diamond. In some implementations, the diamond crystal 104 is brazed to the pin 103.

In the example shown in FIG. 2A, the assembly 400 (which includes the pin 103 and diamond crystal 104) can be adjusted in the cylindrical slot 109 in the shank 102. For instance, the screw 105 can be removed or loosened to allow the assembly 400 to rotate (radially) in the cylindrical slot 109. After the assembly 400 has been rotated in the cylindrical slot 109, the screw 105 can be installed or tightened to secure the assembly 400 in place.

Rotating the assembly 400 in the cylindrical slot 109 can be useful for increasing the working life of the diamond crystal 104. For instance, operating the tool 100 causes the working section of the diamond crystal 104 to become dull, and the assembly 400 can be rotated to use another (sharp) section of the diamond crystal 104 as the working section. In this manner, the perimeter (or sections of the perimeter) of the diamond crystal 104 can include multiple working sections, and each working section can be used before the diamond crystal 104 needs to be sharpened. In this manner, the diamond crystal 104 has a longer working life before it needs to be sharpened. Moreover in some cases rotating the diamond cutter to a new pristine edge gives good control over the cutting pressure the tool exerts on a workpiece. For thin workpieces this means in some cases that any deflection due to cutting pressure in the workpiece may be repeatable (e.g., perfectly repeatable) and can be accounted for by proper compensation control of the cutting path in a successive set of cuts.

FIG. 5A shows a side view of another example assembly 500 that can be included in a diamond machining tool such as, for example, the tool 100 shown in FIG. 1. FIG. 5B shows a top view of the example assembly 500 shown in FIG. 5A. The assembly 500 includes a pin 503 and diamond crystal 504, which can be used as alternatives to the example pin 103 and diamond crystal 104 shown in FIGS. 4A, 4B.

The example pin 503 shown in FIGS. 5A and 5B has a cylindrical shape, and the diamond crystal 504 is secured to an end of the pin 503. The diamond crystal 504 has a partial frustoconical shape; the diamond crystal 504 includes the central portion of the frustoconical shape about a diameter in a first direction. As shown in FIG. 5A, the diameter of the diamond crystal 504 (the longest dimension of the diamond crystal 504) increases from a first end 522 (nearest the pin 503) toward a second end 521 (farthest from the pin 504). The perimeter 523 of the diamond crystal 504 includes two radiused (or arched) portions and two flat portions. The radiused portions have a chamfered edge. In some examples, the pin 503 and the diamond crystal 504 have the dimensions and chamfer profile described above with respect to the pin 103 and diamond crystal 104 of FIGS. 4A, 4B, and the diamond crystal 504 can have a width (perpendicular to the diameter) of 1.8 millimeters (mm). The assembly 500 may have other dimensions.

In some instances, the example assembly 500 shown in FIG. 5 can be rotated in the cylindrical bore of a shank, for example, as describe with respect to the assembly 400 shown in FIG. 4. In this manner, the radiused portions of the diamond crystal 504 can include multiple working sections, and each working section can be used before the diamond crystal 504 needs sharpening. In this manner, the diamond crystal 504 has a longer working life before it needs to be sharpened.

Figure 6:
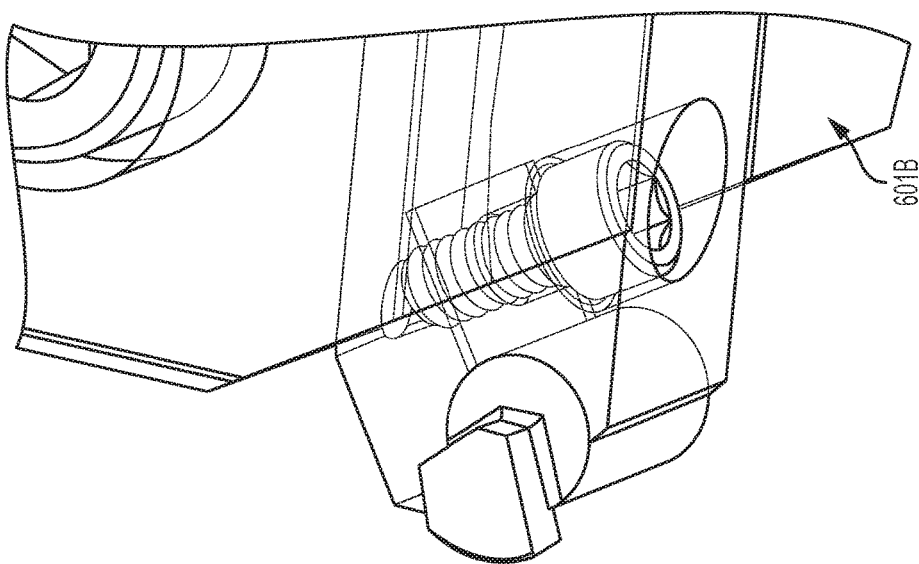
FIG. 6 is a perspective view of an example machining tool.
Figure 6:
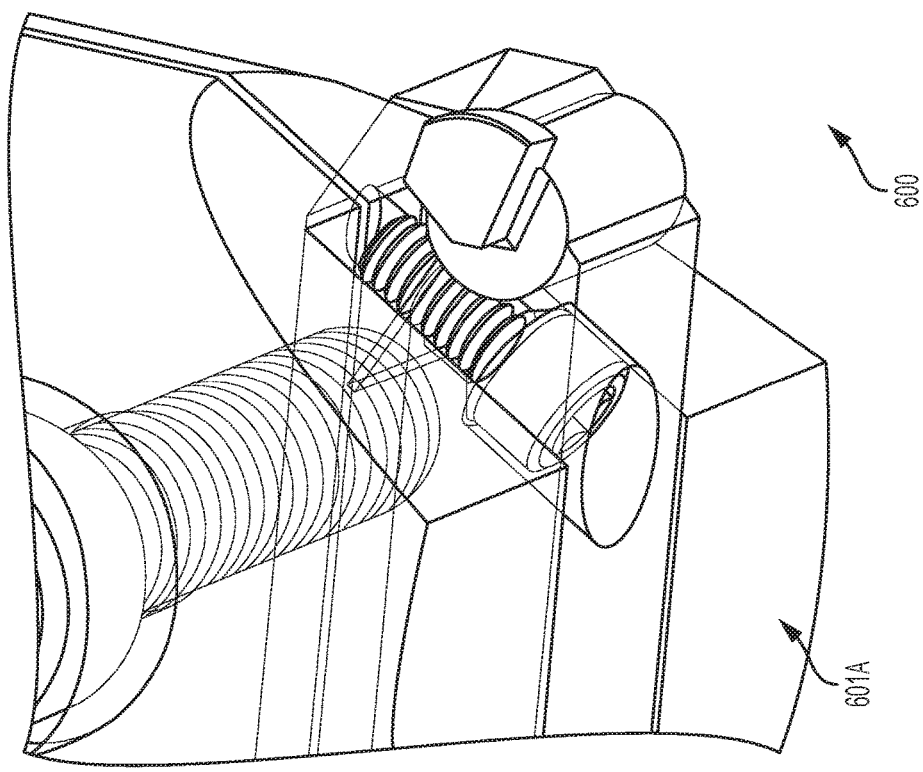

FIG. 6 is a perspective view of an example tool 600. The tool 600 shown in FIG. 6 is an example of a diamond machining tool that can be used to machine a workpiece. In some cases, the workpiece can be a crystal material, such as, for example, a silicon crystal or another type of crystal. The example tool 600 can be used to machine a flat surface of the workpiece, for instance, a component having a thin planar geometry.

In some implementations, the tool 600 can be used to machine one or more components of an interferometer system, a diffraction grating system, an x-ray diffractometer system or another type of system. For example, the tool 600 may be used to machine the blades 802 of the example neutron interferometer 800 shown in FIG. 8. The tool 100 may be used to manufacture other types of systems.

The example tool 600 includes two assemblies 601A and 601B. Each of the example assemblies 601A, 601B shown in FIG. 6 can be configured similar to the tool 100 shown in FIG. 1. As shown in FIG. 6, the tool 600 includes two diamond crystals (one on each assembly 601A, 601B) oriented in opposite directions to simultaneously machine opposite sides of a planar workpiece, resulting in little or no deflection and low excitations of vibrations of the thin planar workpiece due to any cutting forces. By translating shank 102 on one or both sides (601A and 601B) a desired thickness of a thin planar workpiece can be achieved.

Figure 7:
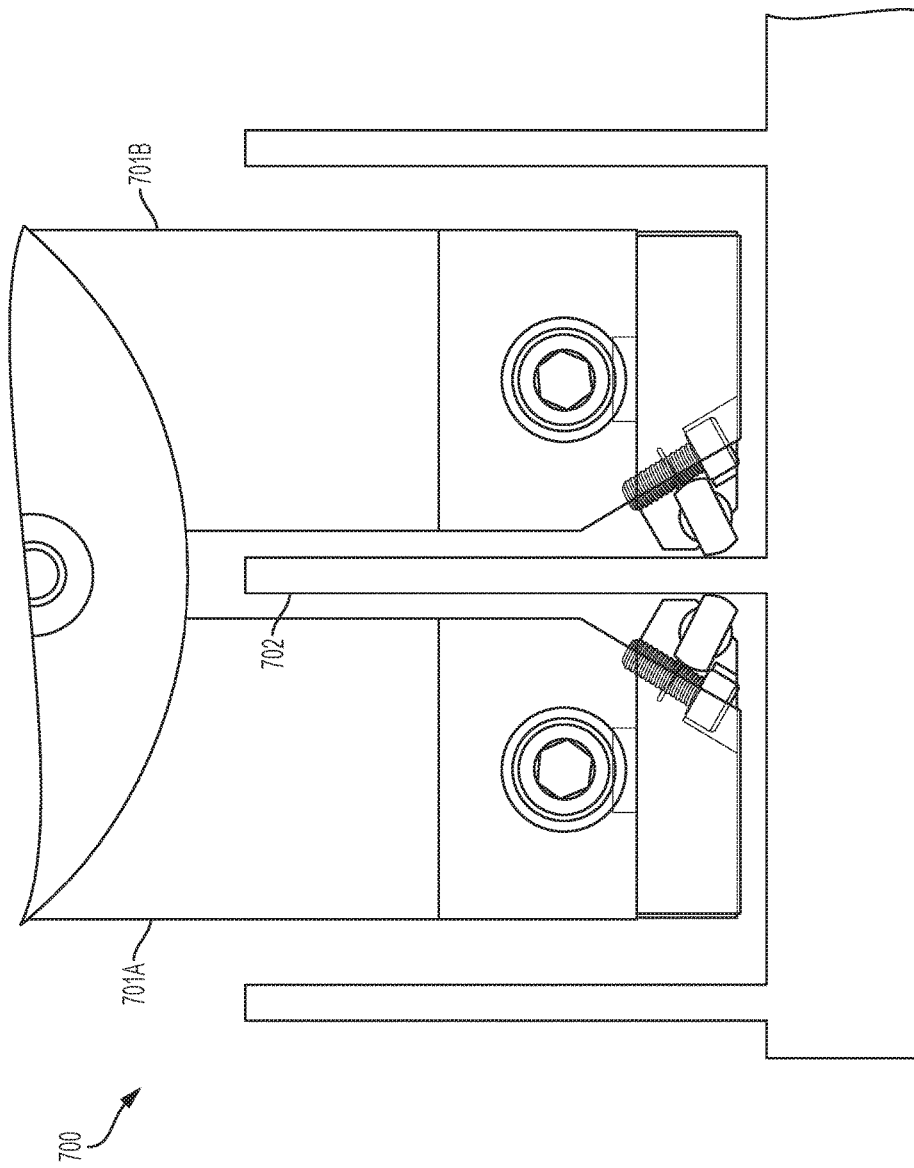
FIG. 7 is a diagram showing an example tool machining a workpiece.

FIG. 7 is a diagram showing an example tool 700 machining a workpiece 702. The example tool 700 shown in FIG. 7 includes two assemblies 701A and 701B, similar to the assemblies 601A and 601B of the example tool 600 shown in FIG. 6. As shown in FIG. 7, the tool assemblies 701A, 701B bear on opposite sides of the workpiece 702 to form a smooth, flat surface on both sides of the workpiece 702. The workpiece 702 can be, for example, one of the blades 802 of the example neutron interferometer 800 shown in FIG. 8, or another type of thin planar component.

Figure 8A:
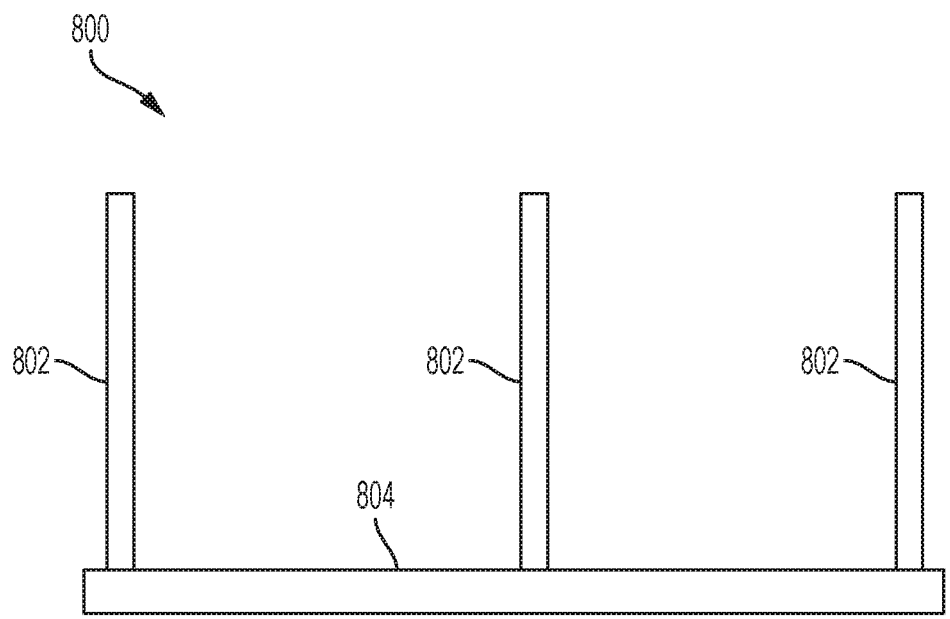
FIG. 8A is a side view of an example neutron interferometer.
Figure 8B:
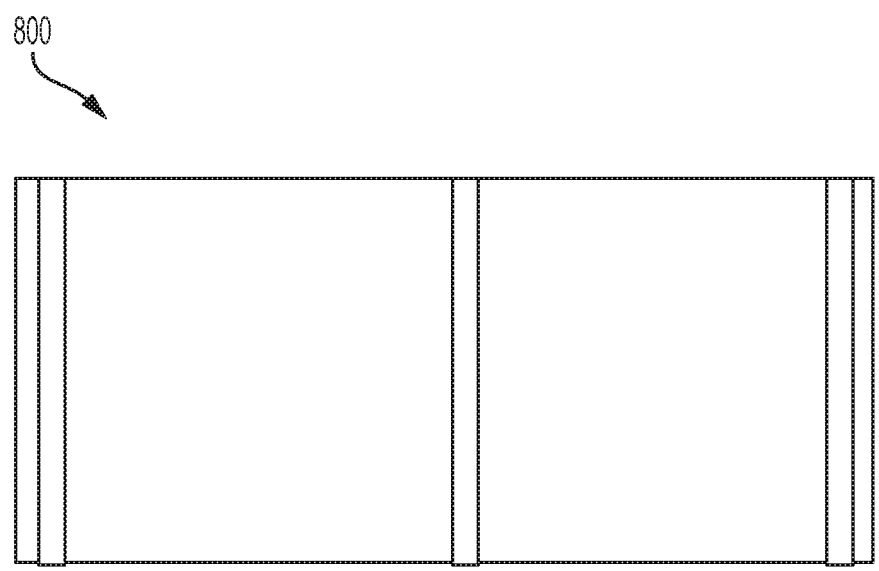
FIG. 8B is a top view of the example neutron interferometer shown in FIG. 8A.

FIG. 8A is a side view of an example neutron interferometer 800; FIG. 8B is a top view of the example neutron interferometer 800 shown in FIG. 8A. The example neutron interferometer includes a base 804 and three blades 802 extending from the base 804. The base 804 and the three blades 802 can be formed from a single crystal, for example, from a single silicon crystal. In some cases, the blades 802 of the neutron interferometer 800 are machined by a single point diamond machining tool. For example, the diamond machining tools described above and shown in the figures may be used to form flat, smooth surfaces on either side of the blades 802.

In a general aspect, a machining tool includes a diamond crystal having a working section configured to machine a workpiece.

In a first example, a machining tool includes a body (e.g., the body 101 shown in FIG. 1 or another type of body), a shank (e.g., the shank 102 shown in FIG. 2A or another type of shank) extending from the body, and an assembly (e.g., the assembly 400 shown in FIG. 4, the assembly 500 shown in FIG. 5, or another type of assembly) carried by the shank. One end of the shank defines a cylindrical slot (e.g., the cylindrical slot 109 shown in FIG. 3B or another type of slot) outside the body. The assembly includes a cylindrical pin (e.g., the pin 103 shown in FIG. 4A, the pin 503 shown in FIG. 5A, or another type of pin) that resides in the cylindrical slot. The assembly includes a diamond crystal (e.g., the diamond crystal 104 shown in FIG. 4A, the diamond crystal 504 shown in FIG. 5A, or another type of diamond crystal) secured to an end of the cylindrical pin. The diamond crystal has a curved perimeter (e.g., circular perimeter 423 shown in FIG. 4A, the arcuate perimeter 523 shown in FIG. 5A, or another type of curved perimeter) that defines a working section. The working section contacts a workpiece during operation of the machining tool. The shank is adapted to allow rotation of the cylindrical pin within the cylindrical slot to modify the working section. For instance, the diamond crystal can be rotated to use a new pristine edge as the working section.

Implementations of the first example may include one or more of the following features. The diamond crystal can define a radius that increases from a first end (e.g., the first end 422 shown in FIG. 4A, the first end 522 shown in FIG. 5A) of the diamond crystal to a second end (e.g., the second end 421 shown in FIG. 4A, the second end 521 shown in FIG. 5A) of the diamond crystal, where the second end of the diamond crystal includes the curved perimeter that defines the working section. The diamond crystal can have a frustoconical shape, and the curved perimeter can be the circumference of the second end. The diamond crystal can have a partial frustoconical shape, and the curved perimeter can be a radiused portion of the second end. The curved perimeter can include a chamfered edge that forms at least a portion of the working section. The shank can include a means for adjusting the shank (e.g., the screw 105 shown in FIG. 2C) to allow the rotation of the cylindrical pin within the cylindrical slot. The shank can be adapted to allow rotation of the cylindrical pin within the cylindrical slot to enable use of multiple portions of the curved perimeter as the working section.

In a second example, a machining tool includes a first tool assembly and a second tool assembly (e.g., the first assembly 601A and the second assembly 601B shown in FIG. 6). The first tool assembly and the second tool assembly can each independently include one or more of the features of the machining tool described in the first example. The first and second machining tools include respective diamond crystals, which have opposite orientations to simultaneously machine opposite sides of a workpiece during operation of the machining tool. In some cases, the first tool assembly and the second tool assembly include respective shanks that are translatable to define a thickness of the workpiece.

In a third example, a machining method includes machining a first workpiece surface by operation of a machining tool. The machining tool includes a shank that carries a diamond crystal, and the diamond crystal has a curved perimeter that defines a working section that bears on the first workpiece surface to machine the first workpiece surface. After machining the first workpiece surface, the diamond crystal is rotated with respect to the shank to modify the working section defined by the curved perimeter (e.g., to use a pristine edge of the curved perimeter as the working section or to otherwise modify the working section). After rotating the diamond crystal with respect to the shank, a second workpiece surface is machined by operation of the machining tool. The modified working section bears on the second workpiece surface to machine the second workpiece surface.

Implementations of the third example may include one or more of the following features. Machining the first and second workpiece surfaces can include ruling the first and second workpiece surfaces. Machining the first workpiece surface can include using a first portion of the curved perimeter as the working section, and machining the second workpiece surface can include using a second portion of the curved perimeter as the working section. When the diamond crystal is rotated, the second portion may define a sharper working section than the first portion.

Implementations of the third example may include one or more of the following features. Machining the first and second workpiece surfaces can include machining silicon crystal surfaces, and the working section bearing on the silicon crystal surfaces can cause a local phase transition in the silicon crystal surfaces. Machining the first and second workpiece surfaces can include machining one or more blades of a neutron interferometer. The shank may be translated to define a thickness of a workpiece.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A machining tool comprising:
   a body comprising an opening that defines a translation axis, the opening configured to hold a shank at a selectable position along the translation axis, the selectable position defining an extension of the shank from the body;
   the shank, disposed in the opening at the selectable position and comprising an end that defines a cylindrical slot outside the body; and
   an assembly carried by the shank, the assembly comprising:
   a cylindrical pin that resides in the cylindrical slot, and
   a diamond crystal secured to an end of the cylindrical pin, the diamond crystal comprising a curved perimeter that defines a working section that contacts a workpiece during operation of the machining tool;
   wherein the shank is adapted to allow rotation of the cylindrical pin within the cylindrical slot to enable use of multiple portions of the curved perimeter as the working section.

2. The machining tool of claim 1, wherein the diamond crystal defines a radius that increases from a first end of the diamond crystal to a second end of the diamond crystal, and the second end of the diamond crystal comprises the curved perimeter that defines the working section.

3. The machining tool of claim 2, wherein the diamond crystal has a frustoconical shape, and the curved perimeter comprises a circumference of the second end.

4. The machining tool of claim 2, wherein the diamond crystal has a partial frustoconical shape, and the curved perimeter comprises a radiused portion of the second end.

5. The machining tool of claim 2, wherein the curved perimeter comprises a chamfered edge that forms at least a portion of the working section.

6. The machining tool of claim 1, wherein the shank comprises a means for adjusting the shank to allow the rotation of the cylindrical pin within the cylindrical slot.

7. A machining tool comprising:
a first tool assembly comprising:
a body comprising an opening that defines a translation axis, the opening configured to hold a first shank at a selectable position along the translation axis, the selectable position defining an extension of the first shank from the body,
the first shank, disposed in the opening at the selectable position and comprising an end that defines a cylindrical slot outside the body, and
an assembly carried by the first shank, the assembly comprising:
a cylindrical pin that resides in the cylindrical slot, and
a first diamond crystal secured to an end of the cylindrical pin, the first diamond crystal comprising a first curved perimeter that defines a first working section that contacts a workpiece during operation of the machining tool,
wherein the first shank is adapted to allow rotation of the cylindrical pin within the cylindrical slot to enable use of multiple portions of the first curved perimeter as the first working section; and
a second tool assembly comprising a second shank that carries a second diamond crystal, the second diamond crystal having a second curved perimeter that defines a second working section that contacts the workpiece during operation of the machining tool, the second shank being adapted to allow rotation of the second diamond crystal with respect to the second shank to modify the second working section,
the first and second diamond crystals having opposite orientations to simultaneously machine opposite sides of a workpiece during operation of the machining tool.

8. The machining tool of claim 7,
wherein the body is a first body, the cylindrical slot is a first cylindrical slot, and the cylindrical pin is a first cylindrical pin; and
wherein the second tool assembly comprises:
a second body,
the second shank extending from the second body and defining a second cylindrical slot outside the second body, and
a second pin assembly carried by the second shank and comprising:
a second cylindrical pin that resides in the second cylindrical slot, and
the second diamond crystal secured to the second cylindrical pin.

9. The machining tool of claim 8, wherein the second shank is translatable.

10. The machining tool of claim 7, wherein each of the respective first and second diamond crystals defines a respective radius that increases from a first end of the respective diamond crystal to a second end of the respective diamond crystal, the second end of the first diamond crystal comprises the first curved perimeter, and the second end of the second diamond crystal comprises the second curved perimeter.

11. A machining method comprising:
machining a first workpiece surface by operation of a machining tool that comprises:
a body comprising an opening that defines a translation axis, the opening configured to hold a shank at a selectable position along the translation axis, the selectable position defining an extension of the shank from the body,
the shank, disposed in the opening at the selectable position and comprising an end that defines a cylindrical slot outside the body, and
an assembly carried by the shank, the assembly comprising:
a cylindrical pin that resides in the cylindrical slot, and
a diamond crystal secured to an end of the cylindrical pin, the diamond crystal comprising a curved perimeter that defines a working section that bears on the first workpiece surface to machine the first workpiece surface,
wherein the shank is adapted to allow rotation of the cylindrical pin within the cylindrical slot to enable use of multiple portions of the curved perimeter as the working section;
after machining the first workpiece surface, rotating the diamond crystal with respect to the shank to modify the working section defined by the curved perimeter; and
after rotating the diamond crystal with respect to the shank, machining a second workpiece surface by operation of the machining tool, wherein the modified working section bears on the second workpiece surface to machine the second workpiece surface.

12. The machining method of claim 11, wherein machining the first workpiece surface comprises ruling the first workpiece surface, and machining the second workpiece surface comprises ruling the second workpiece surface.

13. The machining method of claim 11, wherein machining the first workpiece surface comprises using a first portion of the curved perimeter as the working section, and machining the second workpiece surface comprises using a second portion of the curved perimeter as the working section.

14. The machining method of claim 13, wherein, when the diamond crystal is rotated, the second portion defines a sharper working section than the first portion.

15. The machining method of claim 11, wherein the diamond crystal defines a radius that increases from a first end of the diamond crystal to a second end of the diamond crystal, and the second end of the diamond crystal comprises the curved perimeter that defines the working section.

16. The machining method of claim 11, wherein the curved perimeter comprises a chamfered edge that forms at least a portion of the working section.

17. The machining method of claim 11, wherein machining the first and second workpiece surfaces comprises machining silicon crystal surfaces, and the working section and the modified working section bearing on the respective silicon crystal surfaces causes a local phase transition in the silicon crystal surfaces.

18. The machining method of claim 11, wherein machining the first and second workpiece surfaces comprises machining one or more blades of a neutron interferometer.

19. The machining method of claim 11, comprising translating the shank to define a thickness of a workpiece.

* * * * *